United States Patent
Kim

(10) Patent No.: US 8,789,646 B2
(45) Date of Patent: Jul. 29, 2014

(54) STEERING APPARATUS OF FOR A TRACTOR

(75) Inventor: Joong-Ho Kim, Chungcheongbuk-do (KR)

(73) Assignee: Daeho Co., Ltd., Okcheon-gun, Chungcheongbuk-do (KR)

( * ) Notice: Subject to any disclaimer, the term of this patent is extended or adjusted under 35 U.S.C. 154(b) by 0 days.

(21) Appl. No.: 13/878,048

(22) PCT Filed: May 24, 2011

(86) PCT No.: PCT/KR2011/003781
§ 371 (c)(1),
(2), (4) Date: Apr. 5, 2013

(87) PCT Pub. No.: WO2012/050285
PCT Pub. Date: Apr. 19, 2012

(65) Prior Publication Data
US 2013/0192920 A1    Aug. 1, 2013

(30) Foreign Application Priority Data
Oct. 11, 2010  (KR) .......... 10-2010-0098573

(51) Int. Cl.
*B62D 5/12*  (2006.01)
(52) U.S. Cl.
USPC ........... 180/433; 180/434; 180/435; 180/436; 180/437; 180/438; 180/439; 180/440
(58) Field of Classification Search
USPC .............................. 180/433–440
See application file for complete search history.

(56) References Cited

U.S. PATENT DOCUMENTS

| | | | | |
|---|---|---|---|---|
| 4,064,967 A | * | 12/1977 | Doolittle | 180/435 |
| 4,114,724 A | * | 9/1978 | Doolittle | 180/435 |
| 7,290,637 B2 | * | 11/2007 | Nagata et al. | 180/439 |
| 7,617,907 B2 | * | 11/2009 | Mair et al. | 180/448 |
| 7,854,293 B2 | * | 12/2010 | Derby et al. | 180/444 |
| 2006/0096800 A1 | * | 5/2006 | Saibold et al. | 180/434 |

FOREIGN PATENT DOCUMENTS

JP    09-226615    *  2/1997

* cited by examiner

*Primary Examiner* — Joseph M Rocca
*Assistant Examiner* — Marlon Arce
(74) *Attorney, Agent, or Firm* — John K. Park; Park Law Firm

(57) ABSTRACT

The present invention relates to a steering apparatus for turning front wheels of a tractor. More particularly, the present invention provides a steering apparatus for tractors which includes a steering cylinder provided with left and right cylinder rods which are extended and retracted to the left and the right by steering force transmitted by hydraulic pressure when the driver manipulates the steering wheel, wherein swing links are respectively hinged to ends of the left and right cylinder rods, thus forming a first four-bar link structure, and second four-bar link structures are respectively formed on left and right ends of the first four-bar link structure so that the front wheels can be turned, whereby an angle range within which the front wheels can be turned can be increased.

7 Claims, 7 Drawing Sheets

STEERING APPARATUS OF FOR A TRACTOR

TECHNICAL FIELD

The present invention relates, in general, to steering apparatuses for turning front wheels of tractors and, more particularly, to a steering apparatus for tractors which includes a steering cylinder provided with left and right cylinder rods which are extended and retracted to the left and the right by steering force transmitted by hydraulic pressure when the driver manipulates the steering wheel, wherein swing links are respectively hinged to ends of the left and right cylinder rods, thus forming a first four-bar link structure, and second four-bar link structures are respectively formed on left and right ends of the first four-bar link structure so that the front wheels can be turned, whereby an angle range within which the front wheels can be turned can be increased, and the front wheels can be more smoothly turned.

BACKGROUND ART

Generally, a tractor is an engineering vehicle designed to deliver a high tractive force and conduct different kinds of work in the agriculture or construction field. At present, tractors for agriculture typically include a front loader provided on a front end of a tractor body, and an attachment mounted to the front loader so as to conduct various kinds of work, such as transportation, unloading, loading, etc. Furthermore, a rotavator or the like is mounted to a rear end of the tractor body by a rear connection link so that work such as plowing work can be conducted.

In such tractors for agriculture, power generated from an engine is classified into movement-related power which is transmitted to wheels through a transmission to enable a tractor to move, and PTO (power take-off)-related power which is used to drive different kinds of operating implements mounted to the tractor. To embody transmission of the movement-related power, a four-wheel drive system is typically used.

Typically, the conventional tractor is configured such that when a driver rotates a steering wheel in a clockwise or counterclockwise direction, the front wheels are turned to the left or the right by a steering apparatus. In the case where the front wheel axles are directly coupled to the respective front wheels, when the steering wheel is completely rotated, an angle range within which the front wheels can be turned cannot be over 60°. Therefore, although the steering wheel is completely rotated, the minimum turning radius of the tractor is comparatively wide. Thus, when the tractor is required to be turned around, the tractor must repeatedly move forwards and backwards.

The tractor having the above-mentioned construction must run or turn in place depending on conditions of a work site or the kind of work. As stated above, if the minimum turning radius of the tractor is comparatively wide, the tractor cannot cope with a small area or a case where it must turn around in place, thus reducing work efficiency.

DISCLOSURE

Technical Problem

Accordingly, the present invention has been made keeping in mind the above problems occurring in the prior art, and an object of the present invention is to provide a steering apparatus for tractors which includes a steering cylinder provided with left and right cylinder rods which are extended and retracted to the left and the right by steering force transmitted by hydraulic pressure when the driver manipulates the steering wheel, wherein swing links are respectively hinged to ends of the left and right cylinder rods, thus forming a first four-bar link structure, and second four-bar link structures are respectively formed on left and right ends of the first four-bar link structure so that the front wheels can be turned, whereby an angle range within which the front wheels can be turned can be increased, and the front wheels can be more smoothly turned.

Technical Solution

In order to accomplish the above object, the present invention provides a steering apparatus for turning front wheels of a tractor, including: a steering cylinder receiving a steering force transmitted by hydraulic pressure when a driver manipulates a steering wheel; a first four-bar link structure provided in a medial portion of the steering apparatus, the first four-bar link structure being swung to a left or right by extension or retraction operation of the steering cylinder; and second four-bar link structures respectively provided on left and right ends of the first four-bar link structure.

The steering cylinder may include left and right cylinder rods extended and retracted to the left and the right and is provided parallel to a front wheel axle housing at a position spaced apart from the front wheel axle housing by a predetermined distance, and the first four-bar link structure may be configured such that ends of the left and right cylinder rods are respectively hinged to swing links.

Each of the second four-bar link structure may include: the swing link; a swing arm provided on a corresponding end of the front wheel axle housing, the swing arm turning the corresponding front wheel; and a rod link hinged at a first end thereof to the swing arm and hinged at a second end thereof to the swing arm, thus forming a four-bar link structure.

The steering cylinder may be coupled at a medial portion thereof to a steering cylinder coupling link hinged to a steering cylinder bracket installed on the front wheel axle housing, wherein the steering cylinder coupling link may be configured such that the steering cylinder is prevented from being moved to the left or the right and is allowed to be moved forwards or rearwards by a predetermined distance.

The steering cylinder may be swung upwards and downwards in a seesaw manner in which a left end of the steering cylinder moves upwards or downwards based on the steering cylinder coupling link while a right end thereof moves downwards or upwards.

The steering cylinder may include a cylinder rod extended or retracted only in one direction, the steering cylinder being coupled at one end thereof to a front wheel axle housing, and the first four-bar link structure may be configured such that both ends of a connection rod are respectively hinged to swing links.

Furthermore, front wheel axles may be disposed above upper portions of front wheels, whereby the front wheels are prevented from being impeded by the front wheel axles, when the front wheels are steered to maximum angles in a clockwise or counterclockwise direction and are turned to a right angle or more with respect to a longitudinal direction of the tractor.

Each of the front wheel axles may be provided at an end thereof with a bevel gear, and a bevel gear shaft that extends downwards may be connected to the bevel gear so that the corresponding front wheel is driven.

The steering cylinder may be installed ahead of the front wheel axles.

Advantageous Effects

A steering apparatus for tractors according to the present invention includes a steering cylinder provided with left and right cylinder rods which are extended and retracted to the left and the right by steering force transmitted by hydraulic pressure when the driver manipulates the steering wheel. Swing links are respectively hinged to ends of the left and right cylinder rods, thus forming a first four-bar link structure. Second four-bar link structures are respectively formed on left and right ends of the first four-bar link structure so that the front wheels can be turned. Thereby, an angle range within which the front wheels can be turned can be increased. Furthermore, when the front wheels are turned, they can be controlled such that the steering angle of the front wheel that is disposed at a side corresponding to the direction in which the tractor turns is larger than the steering angle of the front wheel that is disposed at the other side, thus making the turning of the tractor smoother.

Moreover, in the present invention, the steering cylinder is vertically swung in a seesaw manner in which a left end thereof is moved upwards or downwards based on a steering cylinder coupling link while a right end thereof is moved downwards or upwards, thus preventing the cylinder rods of the steering cylinder from being bent when steering. Thereby, a problem of the steering cylinder malfunctioning because of the cylinder rods being bent can be prevented.

In addition, front wheel axles are disposed at positions higher than upper portions of the front wheels. Thus, the front wheels are prevented from being impeded by the front wheel axles even when the front wheels are steered to maximum angles in a clockwise or counterclockwise direction and turned to an angle over or approximate to the right angle with respect to the longitudinal direction of the tractor. Therefore, the tractor can be easily turned in one place.

DESCRIPTION OF THE REFERENCE NUMERALS IN THE DRAWINGS

Figure 1:
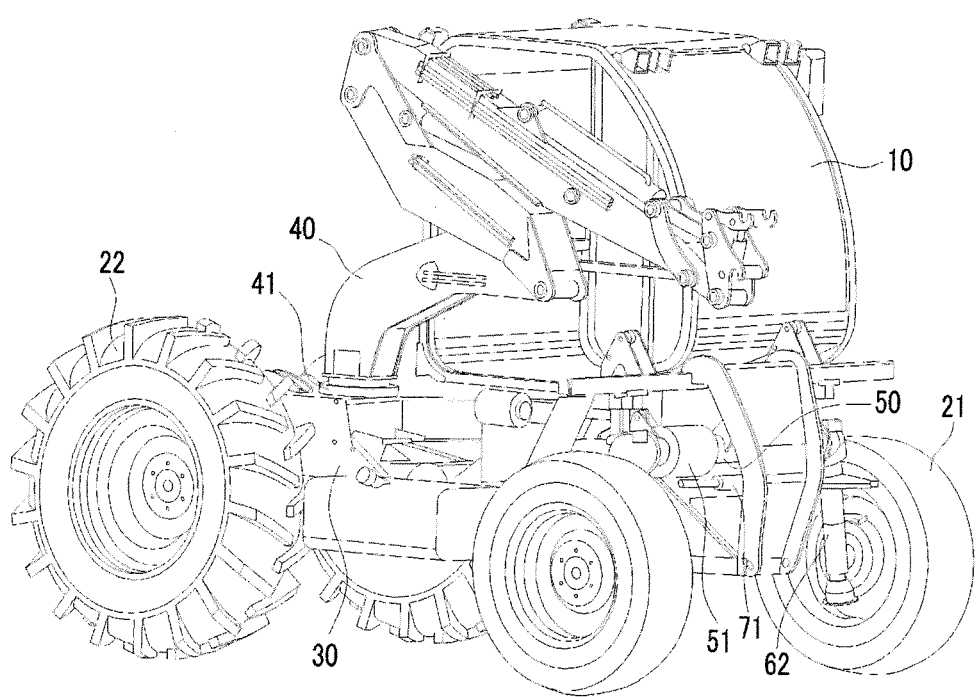
FIG. 1 is a view illustrating an embodiment of a tractor that uses the present invention.
Figure 2:
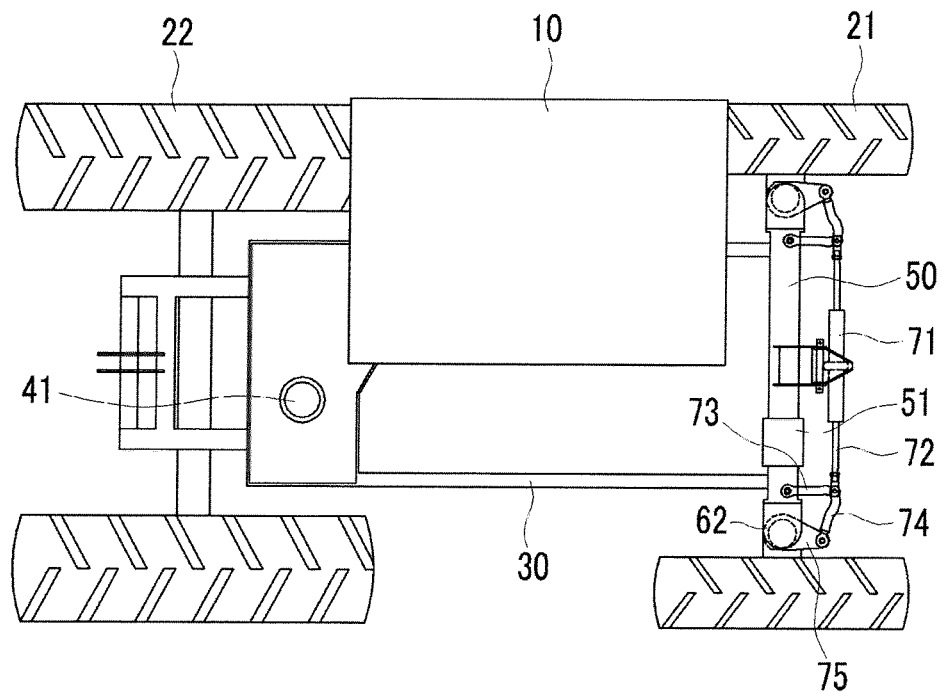
FIG. 2 is a plan view showing a critical portion of the tractor that uses the present invention.

10: driver cab
21: front wheel
21a: wheel frame
21b: wheel rotating shaft
22: rear wheel
30: body frame
40: articulated arm
41: rotating shaft
50: front wheel axle housing
51: front wheel differential device
52: steering cylinder bracket
53: front wheel axle
54: steering cylinder coupling link
61: gear unit housing
62: swing housing
63, 64, 66: bevel gear
65: bevel gear shaft
67: rotating member
68: front-wheel-shaft coupling housing
71: steering cylinder
72: cylinder rod
73: swing link
74: rod link
75: swing arm
76: connection rod

BEST MODE

Hereinafter, a tractor according to the present invention will be described in detail with reference to the attached drawings.

As shown in FIG. 1, in an embodiment of the tractor that uses the present invention, a driver cab 10 having a driver seat therein is located on a left side portion of a body frame 30 of the tractor, and an articulated arm 40 is disposed on a portion of the body frame 30 where the driver cab 10 is not located, so as to maintain the balance of the tractor. The articulated arm 40 is coupled to a rotating shaft 41 so that the articulated arm 40 can be rotated along with the rotating shaft 41. In detail, the driver cab 10 is disposed between front wheels 21 and rear wheels 22 of the tractor and located on the left side portion of the tractor such that a space is formed beside the driver cab 10. When the articulated arm 40 is not in use, the articulated arm 40 is maintained in a folded state in this space.

Furthermore, a steering cylinder 71 is provided on a front end of the body frame 30 in front of a front wheel axle housing 50 which houses front wheel axles 53 therein. The steering cylinder 71 includes left and right cylinder rods 72 which are extended and retracted to the left and the right by steering force transmitted by hydraulic pressure when a driver manipulates a steering wheel. The front wheel axles 53 are disposed at a position higher than upper surfaces of the front wheels 21.

A steering apparatus for tractors according to the present invention is not limited to the structure shown in FIG. 1 that includes the driver cab 10, the articulated arm 40, etc.

The steering apparatus for tractors according to the present invention will be explained in detail with reference to FIGS. 2 through 8.

The steering apparatus according to the present invention functions to steer the front wheels 21 of the tractor in the clockwise or counterclockwise direction. The steering apparatus is disposed in front of the front wheel axle housing 50 that houses the front wheel axles 53 therein.

Figure 4:
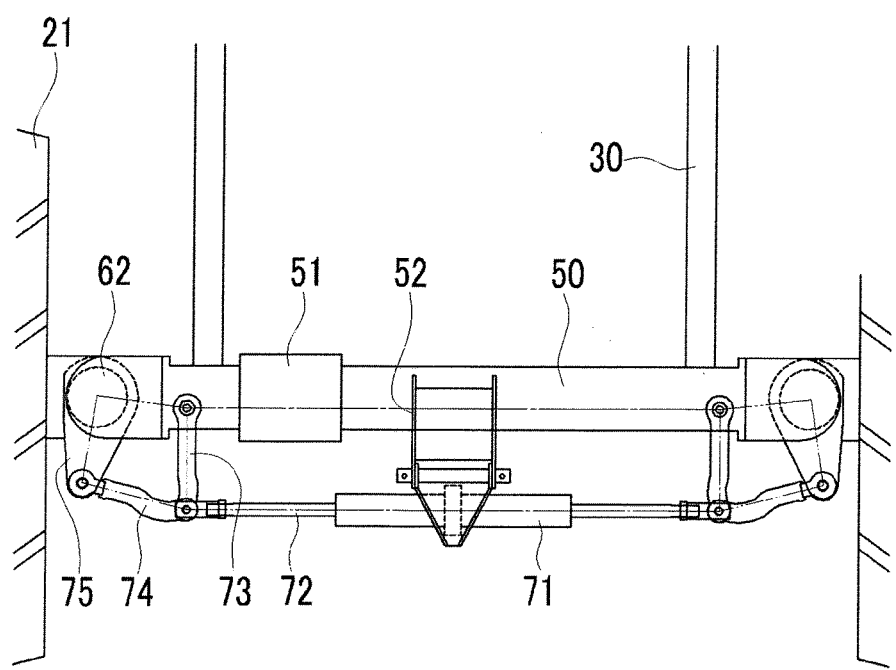
FIG. 4 is a plan view of the steering apparatus according to the present invention.

As shown in FIG. 4, in the steering apparatus, the steering cylinder 71 includes the left and right cylinder rods 72 which are extended and retracted to the left and the right by steering force transmitted by hydraulic pressure when the driver manipulates the steering wheel. The steering cylinder 71 is provided in front of the front wheel axle housing 50 at a position spaced apart from the front wheel axle housing 50 by a predetermined distance and is oriented parallel to the front wheel axle housing 50. A first link structure which is swung to the left or right by extension or retraction operation of the steering cylinder 71 is provided on a medial portion of the steering apparatus. The first link structure comprises a first four-bar link structure which is formed in such a way that ends of the left and right cylinder rods 72 are respectively hinged to swing links 73. Second four-bar link structures are formed on left and right sides of the first four-bar link structure. These structures make it possible to steer the front wheels.

The first four-bar link structure is configured such that first ends of the left and right swing links 73 are hinged to the front wheel axle housing 50 and second ends thereof are respectively hinged to the ends of the left and right cylinder rods 72. Thus, when the left and right cylinder rods 72 are extended and retracted and thus are moved to the left or the right, the left and right swing links 73 are swung to the left or the right.

Each second four-bar link structure includes the swing link 73, a swing arm 75 which is provided on the end of the front wheel axle housing 50 to turn the front wheel, and a rod link 74 which is hinged at a first end thereof to the swing arm 75 while a second end thereof is hinged to the swing arm 75.

Figure 9:
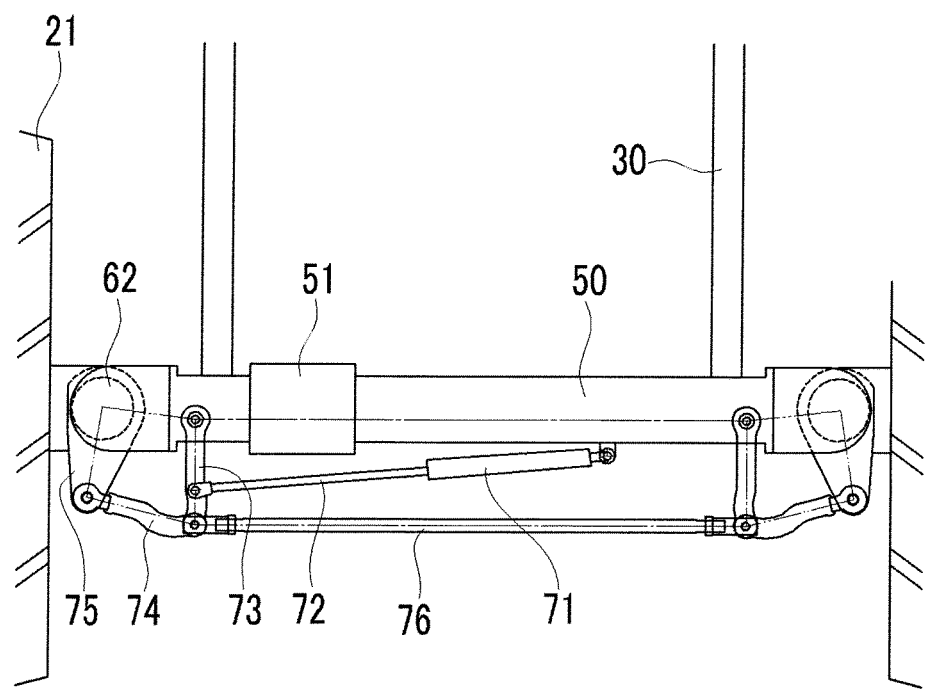
FIG. 9 is a plan view showing another embodiment of the steering apparatus according to the present invention.

Meanwhile, as shown in FIG. 9, in another embodiment of the steering apparatus, the steering cylinder 71 includes a cylinder rod 72 which is extended or retracted only in one direction. The steering cylinder 71 is coupled at a first end thereof to the front wheel axle housing 50. A first four-bar link structure which is swung to the left or the right by extension or retraction operation of the steering cylinder 71 is provided in a medial portion of the steering apparatus. The first link structure includes a connection rod 76 which connects hinge points of left and right swing links 73 to each other. In other words, both ends of the connection rod 76 are respectively hinged to the swing links 73.

As described above, in the case where the first four-bar link structure is formed both by the steering cylinder 71 having the left and right cylinder rods 72 and by the two swing links 73, because the second four-bar link structures are respectively provided on the left and right sides of the first four-bar link structure, the angular range within which the front wheels 21 can be steered can be increased (by a range of 70° to 110°). Further, when the front wheels 21 are steered, they can be controlled such that the steering angle of the front wheel that is disposed at a side corresponding to the direction in which the tractor turns is larger than the steering angle of the front wheel that is disposed at the other side, thus making the turning of the tractor smoother.

Figure 3:
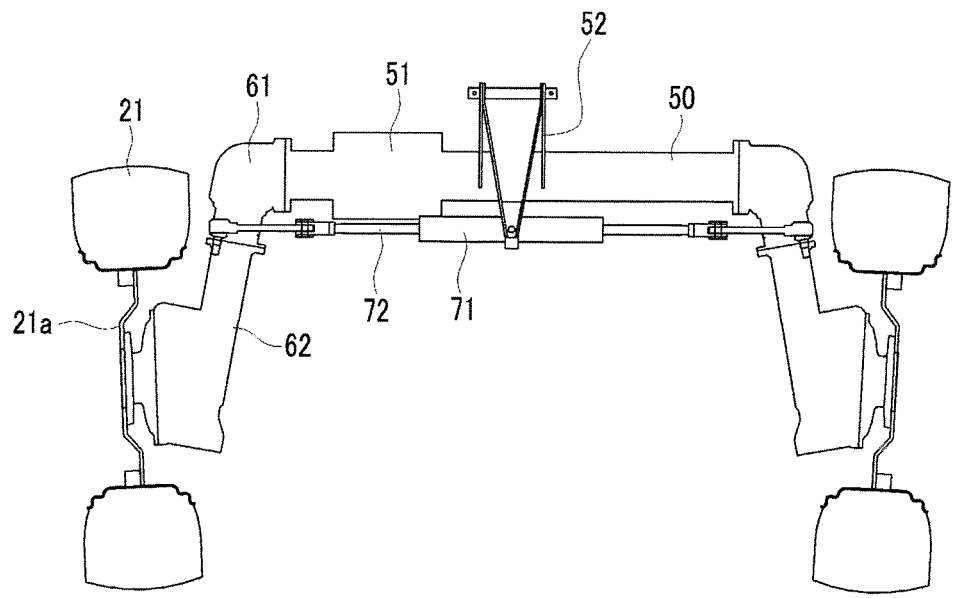
FIG. 3 is a front view of a steering apparatus of the tractor, according to the present invention.

Furthermore, as shown in FIG. 3, the front wheel axles 53 and the front wheel axle housing 50 are disposed at positions higher than the upper surfaces of the front wheels 21 so that, when the steering apparatus steers the front wheels in the clockwise or counterclockwise direction to maximum angles (70° to 110°), the front wheels 21 can be prevented from being impeded by the front wheel axles 53 or the front wheel axle housing 50 that houses the front wheel axles 53

Figure 5:
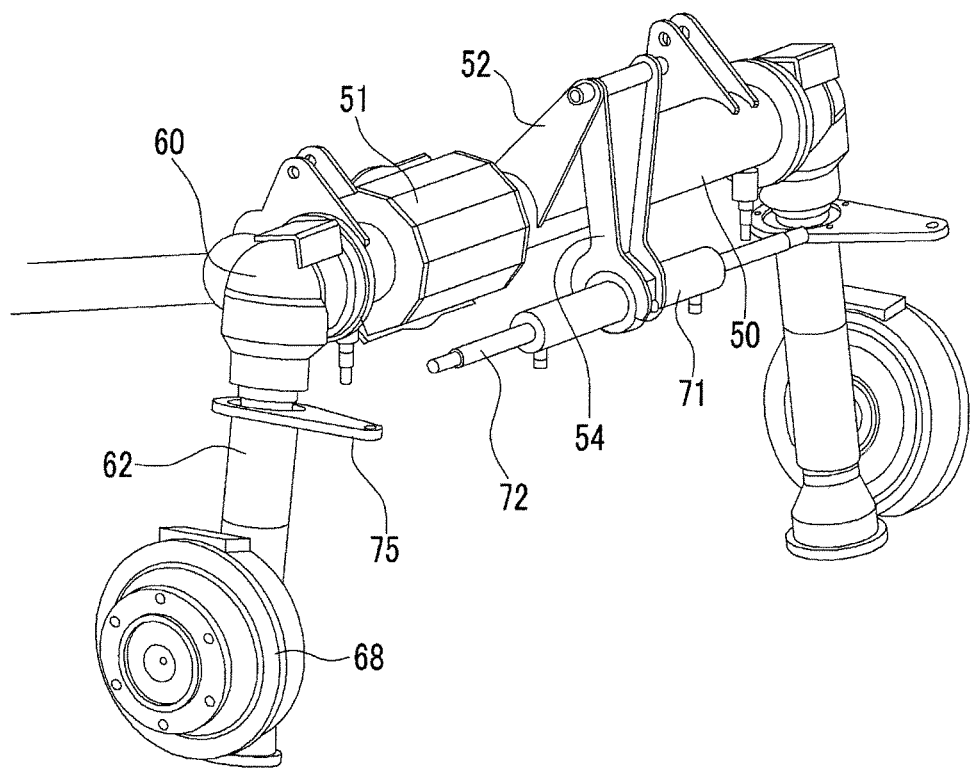
FIG. 5 is a perspective view illustrating a critical portion of the steering apparatus according to the present invention.

In this case, as shown in FIGS. 3 and 5, a path along which power is transmitted from the front wheel axles 53 to the front wheels 21 has a "⊓" shape.

In the case where the front wheel axles 53 and the front wheel axle housing 50 are disposed at positions higher than the upper surfaces of the front wheels 21, the structure for turning the front wheels 21 will be explained with reference to FIG. 6.

Figure 6:
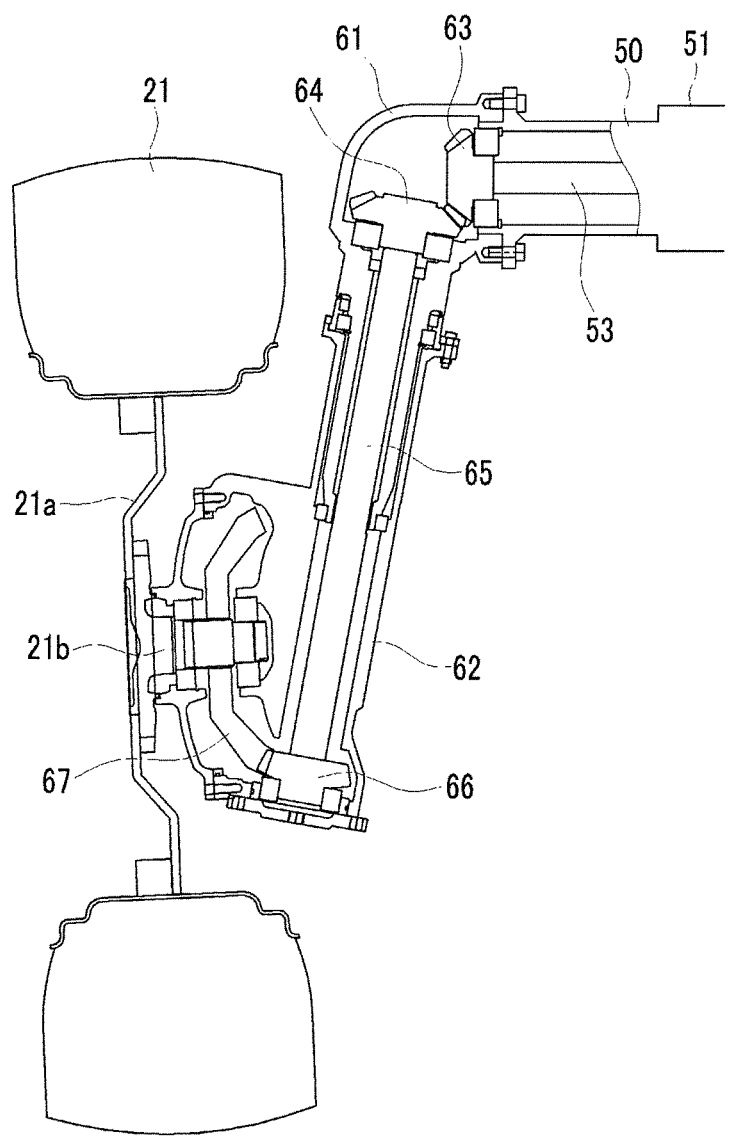
FIG. 6 is a view illustrating a drive device of a front wheel part according to the present invention in detail.

As shown in FIG. 6, power is horizontally transmitted from a front wheel differential device 51 to the left and right front wheel axles 53. Bevel gears 63 and 64 are provided on an end of each front wheel axle 53 and convert the direction of power transmission such that power transmitted to the front wheel axle 53 acts in the vertical direction. A bevel gear shaft 65 extends downwards from the bevel gear 64. A bevel gear 66 is provided on a lower end of the bevel gear shaft 65. The bevel gear 66 engages with a rotating member 67 which is provided to rotate the corresponding front wheel 21. The rotating member 67 is housed in a front-wheel-shaft coupling housing 68.

A gear unit housing 61 is coupled to an end of the front wheel axle housing 50 by a flange coupling structure. The gear unit housing 61 functions to protect the bevel gears 63 and 64 and prevent foreign substances from entering the front wheel axle housing 50. A swing housing 62 is coupled to a lower end of the gear unit housing 61 such that the swing housing 62 can be rotated with respect to the gear unit housing 61 by operation of a steering apparatus. The bevel gear shaft 65, the bevel gear 66 and the rotating member 67 are housed in the swing housing 62.

Each front wheel 21 includes a wheel frame 21a, over which a tire is fitted. A wheel rotating shaft 21b is provided on a central portion of the wheel frame 21a. The wheel rotating shaft 21b is coupled to the rotating member 67 so that the front wheel 21 is rotated by the rotation of the rotating member 67.

Meanwhile, as shown in FIG. 5, the medial portion of the steering cylinder 71 is fixed to an end of a steering cylinder coupling link 54 which is hinged to a steering cylinder bracket 52 installed on the front wheel axle housing 50.

The steering cylinder coupling link 54 is hinged to the steering cylinder bracket 52 such that the steering cylinder 71 coupled to the end of the steering cylinder coupling link 54 is prevented from being moved sideways but is allowed to be moved forwards or rearwards by a predetermined distance.

Furthermore, the steering cylinder coupling link 54 is coupled to the steering cylinder 71 such that the steering cylinder 71 can move in a seesaw manner in which a left end of the steering cylinder 71 moves upwards or downwards based on the steering cylinder coupling link 54 while a right end thereof moves downwards or upwards. In other words, the junction between the steering cylinder coupling link 54 and the steering cylinder 71 functions as a center pivot of a seesaw.

Thanks to the seesaw structure, the left and right second four-bar links can smoothly cope with inclined motion that occurs due to camber angles of the front wheels 21, thus preventing the cylinder rods 72 from being bent when steering.

Figure 7:
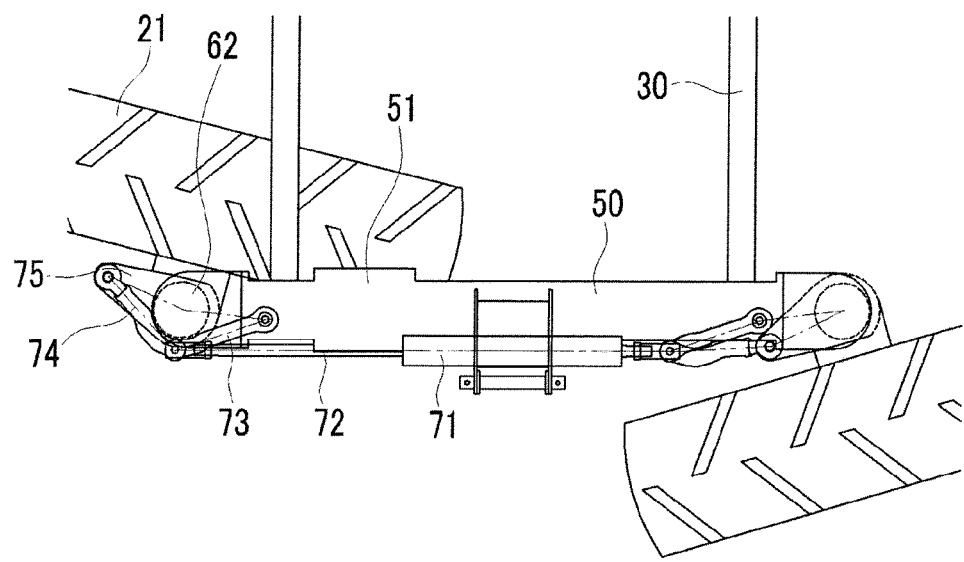
FIG. 7 is a view showing front wheels which have been steered to maximum angles in the clockwise direction according to the present invention.
Figure 8:
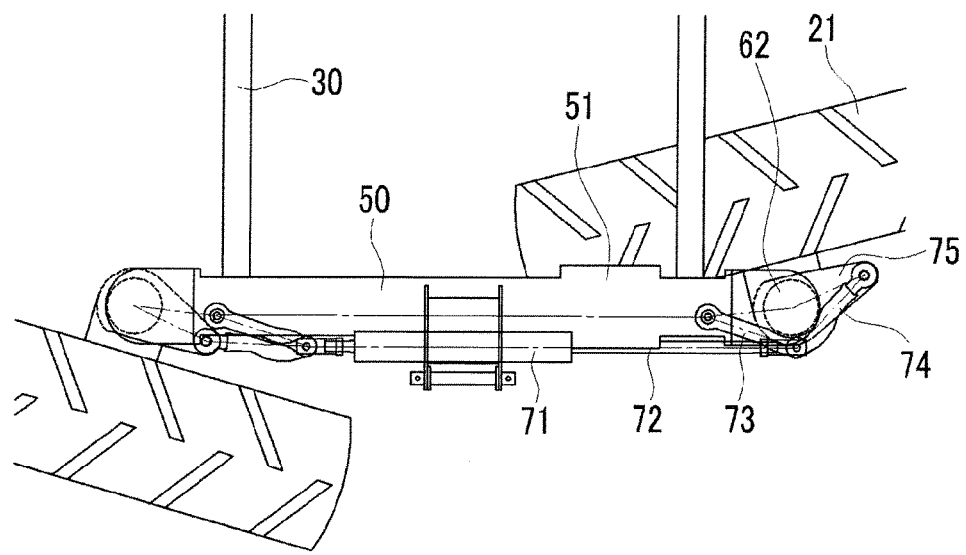
FIG. 8 is a view showing the front wheels which have been steered to maximum angles in the counterclockwise direction.

In the tractor having the above-mentioned construction, when the driver completely rotates the steering wheel in the clockwise or counterclockwise direction, the front wheels enter the state of FIG. 7 or 8.

As shown in FIG. 7, when the driver completely rotates the steering wheel in the clockwise direction, an inside one (the left wheel of FIG. 7) of the front wheels 21 can be turned to 90° or more (in a range of 95° to 105°), and an outside one (the right wheel of FIG. 7) can be turned to an angle of less than 90° (in a range of 80° to 89°).

Furthermore, as shown in FIG. 8, when the driver completely rotates the steering wheel in the counterclockwise direction, an inside one (the right wheel of FIG. 8) of the front wheels 21 can be turned to 90° or more (in a range of 95° to 105°), and an outside one (the left wheel of FIG. 8) can be turned to an angle of less than 90° (in a range of 80° to 89°).

Because the inner wheel (the left wheel of FIG. 7 or the right wheel of FIG. 8) is turned along with the outer wheel (the right wheel of FIG. 7 or the left wheel of FIG. 8) by the steering apparatus, the angle to which the inner wheel of the front wheels 21 is completely turned is determined by a maximum turning angle to which the outer wheel can be turned.

Preferably, the maximum turning angles of the inner wheel and the outer wheel are limited to angles at which the tractor can turn in place with the minimum turning radius. Here, the turning angles of the front wheels 21 at which the tractor can turn in place with the minimum turning radius can be determined by width and length of a rectangle defined by the front wheels 21 and the rear wheels 22. Preferably, the maximum turning angle of the inner wheel of the front wheels 21 is limited to a predetermined angle within a range of 95° to 105° with respect to the straight running direction of the tractor, and the maximum turning angle of the outer wheel of the front wheels 21 is limited to a predetermined angle within a range of 80° to 89° with respect to the straight running direction of the tractor.

In this case, to turn the tractor in one place in a desired direction (in the clockwise direction or the counterclockwise direction), if the driver completely rotates the steering wheel in the desired direction (in the clockwise direction or the counterclockwise direction) and then drives the tractor, the tractor can be turned in one place in the desired direction.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A steering apparatus for turning front wheels of a tractor, comprising: a steering cylinder receiving a steering force transmitted by hydraulic pressure when a driver manipulates a steering wheel; a first four-bar link structure provided in a medial portion of the steering apparatus, the first four-bar link structure being swung to a left or right by extension or retraction operation of the steering cylinder; and second four-bar link structures respectively provided on left and right ends of the first four-bar link structure, wherein the steering cylinder comprises left and right cylinder rods extended and retracted to the left and the right and is provided parallel to a front wheel axle housing at a position spaced apart from the front wheel axle housing by a predetermined distance, and the first four-bar link structure is configured such that ends of the left and right cylinder rods are respectively hinged to swing links, wherein the steering cylinder is coupled at a medial portion thereof to a steering cylinder coupling link hinged to a steering cylinder bracket installed on the front wheel axle housing, wherein the steering cylinder coupling link is configured such that the steering cylinder is prevented from being moved to the left or the right and is allowed to be moved forwards or rearwards by a predetermined distance, wherein the steering cylinder is swung upwards and downwards in a seesaw manner in which a left end of the steering cylinder moves upwards or downwards based on the steering cylinder coupling link while a right end thereof moves downwards or upwards.

2. The steering apparatus of claim 1, wherein each of the second four-bar link structure comprises: the swing link; a swing arm provided on a corresponding end of the front wheel axle housing, the swing arm turning the corresponding front wheel; and a rod link hinged at a first end thereof to the swing arm and hinged at a second end thereof to the swing arm, thus forming a four-bar link structure.

3. The steering apparatus of claim 1, wherein the steering cylinder comprises a cylinder rod extended or retracted only in one direction, the steering cylinder being coupled at one end thereof to a front wheel axle housing, and the first four-bar link structure is configured such that both ends of a connection rod are respectively hinged to swing links.

4. The steering apparatus of claim 1, wherein front wheel axles are disposed above upper portions of front wheels, whereby the front wheels are prevented from being impeded by the front wheel axles, when the front wheels are steered to maximum angles in a clockwise or counterclockwise direction and are turned to a right angle or more with respect to a longitudinal direction of the tractor.

5. The steering apparatus of claim 4, wherein each of the front wheel axles is provided at an end thereof with a bevel gear, and a bevel gear shaft that extends downwards is connected to the bevel gear so that the corresponding front wheel is driven.

6. The steering apparatus of claim 1, wherein the steering cylinder is installed ahead of the front wheel axles.

7. The steering apparatus of claim 1, wherein the steering cylinder is installed ahead of the front wheel axles.

\* \* \* \* \*